United States Patent

[11] 3,563,141

[72] Inventor: Franz W. R. Starp, Calmbach, Black Forest, Germany
[21] Appl. No.: 622,548
[22] Filed: Mar. 13, 1967
[45] Patented: Feb. 16, 1971
[73] Assignee: Prontor-Werk Alfred Gauthier GmbH, Calmback, Black Forest, Germany
[32] Priority: Mar. 12, 1966
[33] Germany
[31] P38,975

[54] PHOTOGRAPHIC CAMERA WITH AN AUTOMATIC, LIGHT-DEPENDENT EXPOSURE SETTING
15 Claims, 4 Drawing Figs.

[52] U.S. Cl. ............................................. 95/10
[51] Int. Cl. ............................................ G01j 1/04
[50] Field of Search ................................. 95/10, 64

[56] References Cited
UNITED STATES PATENTS
3,021,770  2/1962  Dietz ........................ 95/64CX
3,117,503  1/1964  O'Hara ........................ 95/10

Primary Examiner—John M. Horan
Attorney—Arthur A. March

ABSTRACT: A photographic camera having a diaphragm consisting of at least two rotatably mounted blades and an exposure-time-regulating device cooperating with the shutter blade system of the camera, so that by means of an exposure meter built into the camera and a scanning device associated therewith, both light stop and exposure time are automatically controllable in an "AUTO" range and are presettable manually in another range. The camera has simple automatic programming whereby a part of the components of the automatic programming system is utilized for manually setting the light stop and the exposure time as well as for actuating a working range indicator by a highly advantageous configuration and correlation of parts with a minimum of structural expense. Thus, the camera has a control member, forming part of the exposure-time-regulating device and participating in the positioning motions of the diaphragm blades, that engages one of the diaphragm blades directly, and wherein its setting determines the duration of the exposure by the shutter sectors.

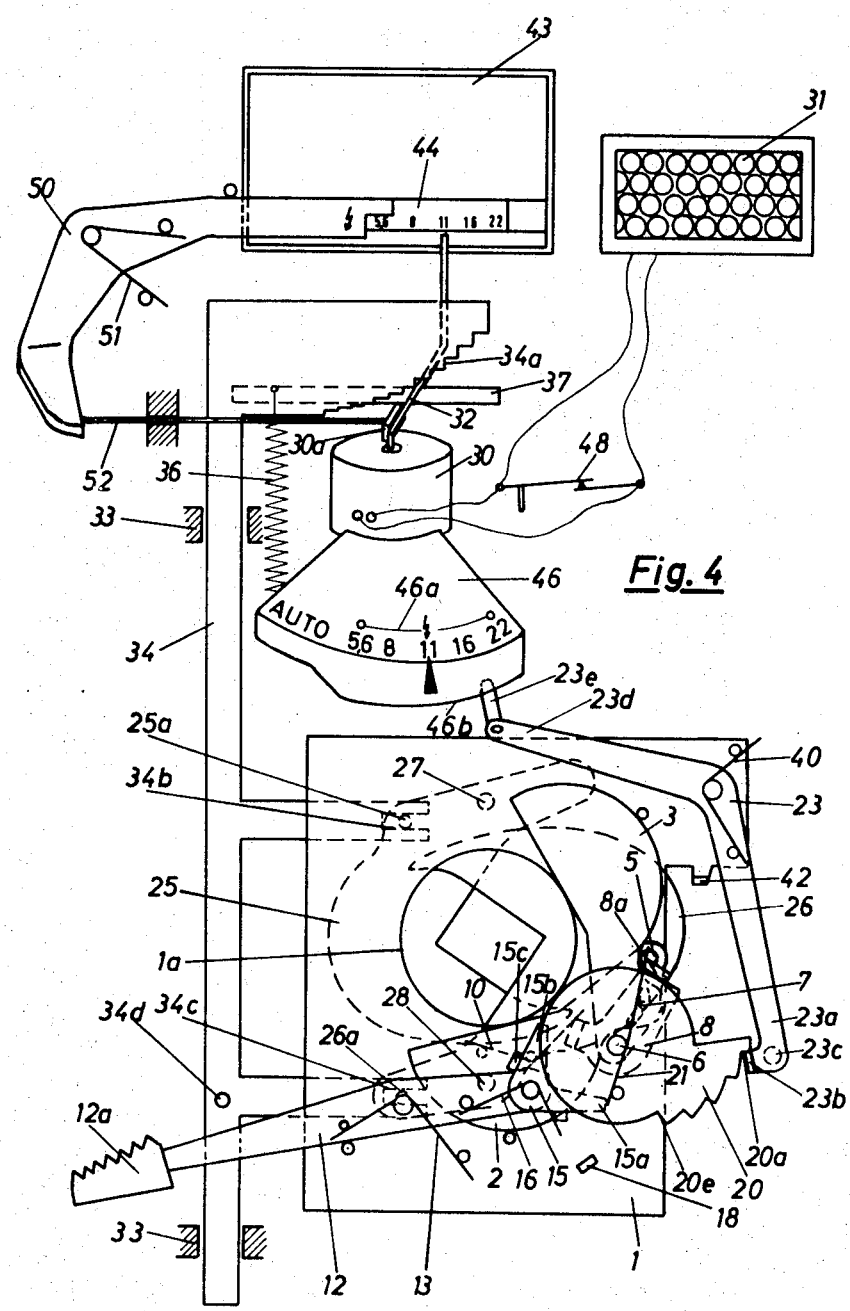

PHOTOGRAPHIC CAMERA WITH AN AUTOMATIC, LIGHT-DEPENDENT EXPOSURE SETTING

The invention relates to a photographic camera having a diaphragm consisting of at least two rotatably mounted blades and an exposure-time-regulating device cooperating with the shutter blade system of the camera, so that by means of an exposure meter built into the camera and a scanning device associated therewith, both light stop and exposure time are automatically controllable in an "AUTO" range and are presettable manually in another range.

In a camera equipped with an exposure meter and a scanning device associated therewith for the purpose of automatic exposure setting controlled by lighting conditions, it is known to design the scanning member as a two-armed transmission lever carrying a scanning cam at one end cooperating with the exposure meter pointed and at its other end being effectively connected to the diaphragm and the exposure-time-regulating device. This arrangement is such that one arm of the transmission lever is connected to the diaphragm blades by a pin-slot arrangement and is provided with an elastic projection which, depending on the setting motion of this lever, is moved a shorter or longer distance into the path of motion of an actuating lever transferring the shutter sectors into the open position and catching it during the shutter runoff. The transmission lever is loaded by the force transmitted from the sector actuating lever, the consequence of which may be an exposure setting deviating from the actual lighting conditions.

Also known is a photographic camera with an automatic exposure control system by means of which both the exposure time and the light stop are settable as a function of the lighting conditions. To set the two exposure factors of time and stop values automatically, a drive system for each has been provided so that the previous systems are not only relatively expensive but, beyond this, undesirably require a relatively large assembly space.

It is an object of this invention to provide a camera with simple automatic programming, distinguished by a neat and parts-saving construction.

It is another object of this invention to provide such a camera whereby a part of the components of the automatic programming system are utilized for manually setting the light stop and the exposure time as well as for actuating a working range indicator by a highly advantageous configuration and correlation of parts with a minimum of structural expense.

It has been found that the foregoing objects and other advantages can be readily attained in a camera according to this invention by providing a control member, forming part of the exposure-time-regulating device and participating in the positioning motions of the diaphragm blades, that engages one of the diaphragm blades directly, and wherein its setting determines the duration of the exposure by the shutter sectors. By having one of the diaphragm blades influence the control member of the exposure-time-regulating device directly it is possible to reduce the structural expense for the setting mechanism serving to set the diaphragm or light stop and exposure time automatically and to simplify the components, so that, it is now possible to create the prerequisites for a camera with relatively simple, reliably functioning automatic programming.

According to a further provision of this invention, a simple and parts-saving automatic programming system can be realized by designing the control part of the exposure-time-regulating device as a pivoted catch lever which rests with one end biased under the effect of a spring against the back of one diaphragm blade. Further, the catch lever is advantageously designed so that it cooperates with a braking weight having several radially gradated cam surfaces which participates in the opening motion of the shutter blades that are reciprocating for back-and-forth movement. The braking weight is so mounted that that it can move back and forth and swing out beyond the reversal phase of the shutter blades against the force of a return spring.

The exposure program achievable with the automatic programming system can be laid out so that, first, with the diaphragm set to stay at its widest stop, the exposure times from the longest to the shortest time are automatically settable. Then, with the shortest exposure time set to stay unchanged, the diaphragm values are automatically settable from the widest to narrowest aperture diameter. For this purpose, the invention provides for the diaphragm blades to have an override extending beyond the opening of the objective so that the diaphragm blades are ineffective whereby the one diaphragm blade, with the catch lever resting against it and the braking weight are so correlated that differing exposure times can be achieved only in the range of the override. When the diaphragm blades enter the range of the opening of the objective, the exposure time remains constant while the diaphragm opening is adapted to narrow steadily. Another exposure program can also be achieved that retains the simple construction in purposefully implementing the invention by laying out the automatic programming system so that the one diaphragm blade, the catch lever resting against it, and the braking weight are so correlated that the light stop and exposure time are changed jointly, thereby achieving various exposure values.

To limit to a minimum the additional structural expense for manually setting light stop and exposure time values, according to the invention it is further provided that the catch lever, supported at one end at the one diaphragm blade, be of a two-armed design and influenceable by a positioner which serves to set or reverse the camera to automatic or manual stop setting. The positioner has a supporting edge, that becomes effective when set to manual stop setting and which positions the catch lever so that an exposure time of, say, one-thirtieth sec., suited for free-hand or flashbulb pictures, is achieved. Accordingly, in an advantageous further development of this invention, provisions are made for the positioner, that serves to set or reverse the camera from one range to another, to be joined to the exposure meter housing for corotation therewith, and for the exposure meter to have a switch assigned to it which is included in its circuit and which short circuits the meter when reversing from automatic to manual exposure time setting.

Structural components of the automatic programming system also can be used advantageously for setting the stops manually, according to the invention, by the correlation of the positioner and housing of the exposure meter so that, upon short circuiting, the joint rotary motion moves the exposure meter pointer to a position whereby, with the aid of the scanning device associated with the pointer, the stop value preset by the positioner are provided. For manually actuating the exposure meter pointer, the housing of the exposure meter desirably can have a stop located in the pointer's plane of motion, against which the pointer comes to rest after the meter is short circuited.

To indicate to the photographer, in a simple manner and without significant additional expense, the working range to which the camera is set, using photographic cameras with an indicating scale associated with the exposure meter that have harmonizing stop and time values, provisions are made according to the invention for an indicating flag assigned to the scale. The flag is movable by the positioner by means of a positioning pin which is so designed and disposed that, in the "AUTO" position of the positioner, the scale is visible, but in the "MANUAL" range or flash range the flag moves over the scale, leaving only those stop values visible which can be set in that range. It is thereby expedient for the portion of the flag which covers the scale values to carry a flash symbol and/or the time value of the exposure time becoming effective in the "MANUAL" range or the flash range.

Other objects and advantages of this invention will be readily apparent from the following detailed description and the attached drawings which illustrate one embodiment as an example of the invention in the form of a self-winding shutter wherein:

FIG. 4 is a view similar to FIG. 1 with the parts shown in the open position and reversed to the manual stop setting range, whereby the stop actuation is also accomplished by means of the scanning device.

Figure 1:
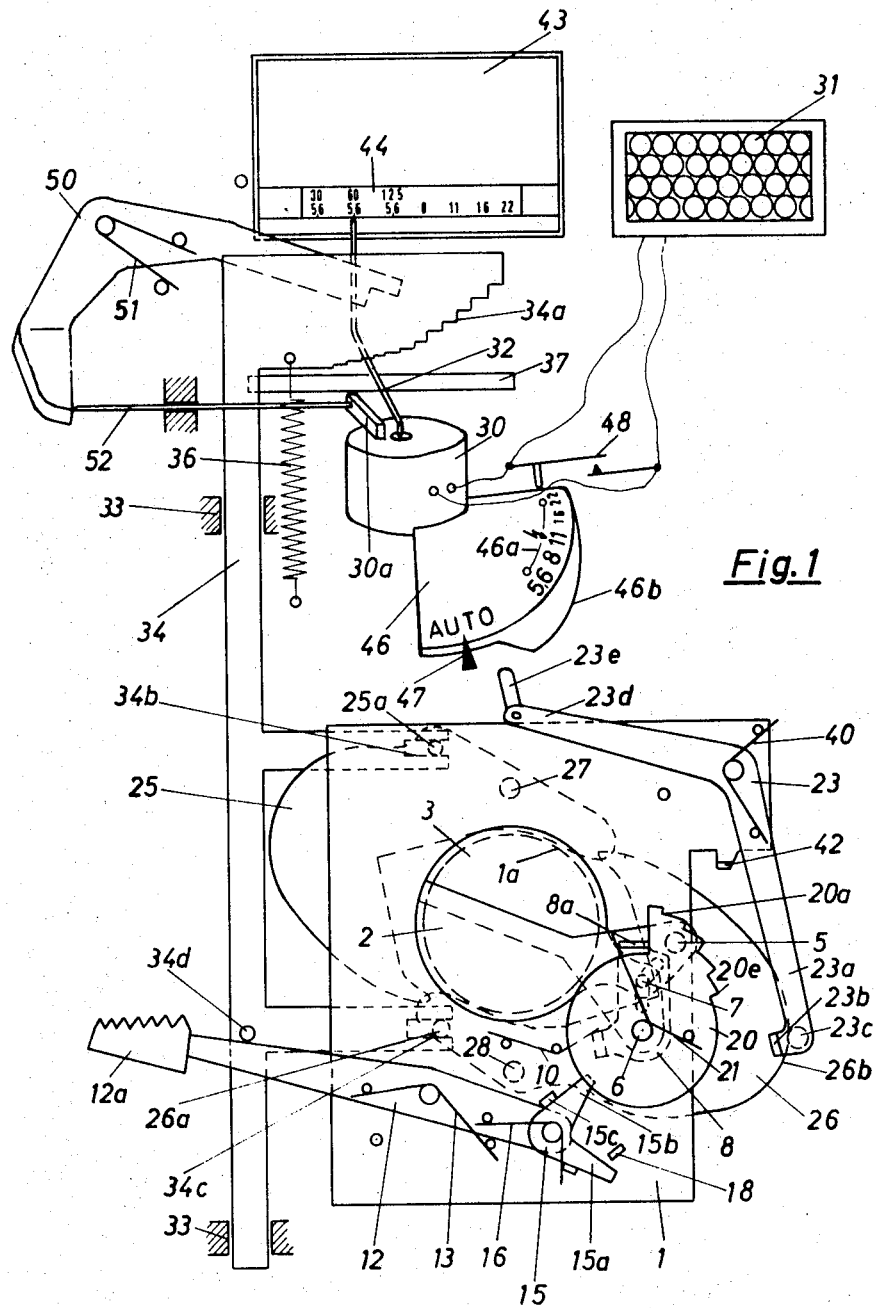
FIG. 1 is a partially diagrammatic view of a self-winding shutter embodying this invention illustrating the parts in the normal position and set to "AUTO" for automatic programming, whereby light stop and exposure time are set by means of a scanning device associated with an exposure meter built into the camera.

Referring now to the drawings, a shutter base plate, designated by the reference numeral 1, is provided with an exposure opening 1a, and has disposed thereon a shutter blade system consisting, in the disclosed embodiment, of two shutter blades 2 and 3. The shutter blades 2 and 3 are mounted on pivot pins 5 and 6, respectively, and are in pin-slot connection with a drive pin 7 of a pivotable actuating lever 8. One of the two mounting pins for the shutter blades 2 and 3 may serve as pivot point for actuating lever 8, for instance, say pin 6 as illustrated in the drawings. The shutter blades 2 and 3 are kept in a closed position by a wound spring 10 biasing the actuating lever 8.

To drive the actuating lever 8, a rotatably mounted, two-armed winding and release lever 12 is provided which, under the effect of a return spring 13, assumes the position shown in FIG. 1. One end of the winding and release lever 12 is provided with a handle 12a while its other end carries a pivotally mounted driving pawl 15. The pawl 15 has two lever arms 15a and 15b disposed approximately at right angles to each other and is engaged with the winding and release lever 12 by means of a tab 15c under the biasing effect of a drive spring 16. While the arm 15a of the drive pawl 15 cooperates during the winding process with a stationary stop 18, the arm 15b engages the actuating lever 8 upon attainment of the wound position and imparts a clockwise rotary motion to it which results in the transfer of shutter blades 2 and 3 into the open position.

As is further evident from the drawing, a simply constructed exposure-time-regulating device is associated with the shutter blade system which, in the disclosed embodiment, has a pivoted braking weight 20, resting under the influence of a wound spring 21 against a tab 8a of the actuating lever 8, adapted to swing out against the force of the spring 21 beyond the reversal point of shutter blades 2 and 3 in their reversal phase during the exposure runoff. The braking weight 20 as well as the wound spring 21 are expediently mounted coaxially with the actuating lever 8. Further, the exposure-time-regulating device comprises a control part 23 which limits the range of deflection of the braking weight 20 in the reversal phase of the shutter blades 2 and 3. The control part 23 is designed in the disclosed embodiment as a two-armed catch lever pivoted on the base plate 1. One arm 23a of the catch lever 23 is provided with a stop 23b which cooperates with a catch cam disposed at the outer periphery of the braking weight 20 having various radially gradated cam surfaces 20a–e. The stop 23b is so positioned with respect to the pivot point of the catch lever 23 that the force of one of the cam surfaces 20a–e striking this stop goes substantially through the bearing centerline of the catch lever 23 which, as will be explained further below, can be controlled by a scanning device.

It is further evident from the drawing that the shutter base plate 1 can also serve to mount a diaphragm consisting of several blades which automatically adjust themselves depending on the prevailing lighting conditions. In the disclosed embodiment the diaphragm is formed by two blades 25 and 26, each being mounted on pins 27 and 28, respectively. Furthermore, the diaphragm blades 25 and 26 are adapted for counterclockwise rotary motion when the diaphragm closes so that the diaphragm blades 25 and 26 can overlap each other.

As to the automatic setting of the diaphragm, the previously mentioned scanning device serves this purpose in cooperation with an exposure meter built into the camera. The exposure meter has a housing 30 with a stop 30a and a coil pivoted in the housing 30. The coil is connected to a photocell 31 and carries an exposure meter pointer 32. The scanning device has a slide 34, movable in stationary guides 33 and provided with a stepped cam 34a for scanning the meter pointer 32. The slide 34 also expediently directly engages the diaphragm blades 25 and 26 through pin-slot connections 25a, 34b and 26a, 34c, respectively. Under the bias of the spring 36, the scanning slide 34 follows the movement of the cocking and releasing lever 12, so that when the slide 34 abuts against the pointer 32 it is in turn pressed against the counterbearing 37. The counterbearing 37 is not located directly in the zone of movement of the scanning slide 34 but in the path of the meter pointer, which is freely movable above the counterbearing 37.

To achieve a simple form of automatic programming with the above-described shutter arrangement, i.e. an automatic setting of exposure time and light stop value depending on the lighting conditions, the catch lever 23 cooperating with the braking weight 20 advantageously directly engages one of the diaphragm blades 25 and 26. To accomplish this, the arm 23a of the catch lever 23 is provided with a scanning pin 23c which can come to rest at the back portion 26b of the blade 26 under the influence of a spring 40. Mounting and design of the diaphragm blades 25 and 26 and the step cam 34a of the scanning slide 34 are advantageously adapted so that the diaphragm blades first traverse an unemployed path from their normal position, illustrated in FIG. 1, to their entry into the range of exposure opening 1a which, for example, corresponds to the stop value "5.6." Provision is also made for the catch lever 23 to be influenced by the blade 26 within this unemployed path only. As soon as the diaphragm blades 25 and 26 swing across the exposure opening 1a, the catch lever 23 runs against a stationary stop 42 which prevents the catch lever from following through. Due to this special measure an exposure value program is formed in which, first, the exposure times, starting from the longest to the shortest time may be run through with the widest diaphragm opening of, say, "5.6" remaining constant. Then the diaphragm openings from its widest to its narrowest opening diameter may be run through with exposure time remaining constant.

If desired, the configuration of the blade 26, the catch lever 23 resting against it and the braking weight 20 could also be such that the diaphragm opening and the exposure time are changed jointly. The exposure values program can be read in the viewfinder 43 of the camera from a scale 44, whereby the respective exposure value is indicated by the free end of the meter pointer 32. The scale 44 can be colored green and the ranges adjoining on either side can be of red coloration so that the photographer can ascertain easily and quickly what the prevailing lighting conditions are by looking into the camera viewfinder 43.

As may further be seen from the drawings, the exposure factors of light stop and time can also be set manually by simple means, for instance, for taking flashbulb pictures. For this purpose a hand-operable setter 46 is provided which cooperates with a stationary setting mark 47 whereby the setter 46 may be positioned in an "AUTO" setting range for automatic programming, or reversed into an additional range having a diaphragm scale 46a as well as by a flash symbol. To set the diaphragm by hand, the structural components of the automatic programming system are advantageously utilized. Thus, the setter 46 is connected to the housing 30 of the exposure meter for corotation and the housing is, as mentioned above, provided with a stop 30a fixing the normal position of the meter pointer 32. When reversing to the "Manual" range 46a, the exposure meter is short circuited by means of short circuit switch 48, which causes the meter pointer 32 to rest against the stop 30a as illustrated in FIG. 4. The setter 46 is further provided with a supporting edge 46b which cooperates with a pin 23e attached to the arm 23d of the catch lever 23 and which moves the catch lever counterclockwise when reversing to the range 46a, thereby positioning its stop 23b so that the outermost cam surface 20a of braking weight 20 strikes this stop during the exposing process, thus achieving an exposure time of, say, one-thirtieth sec.

Figure 2:
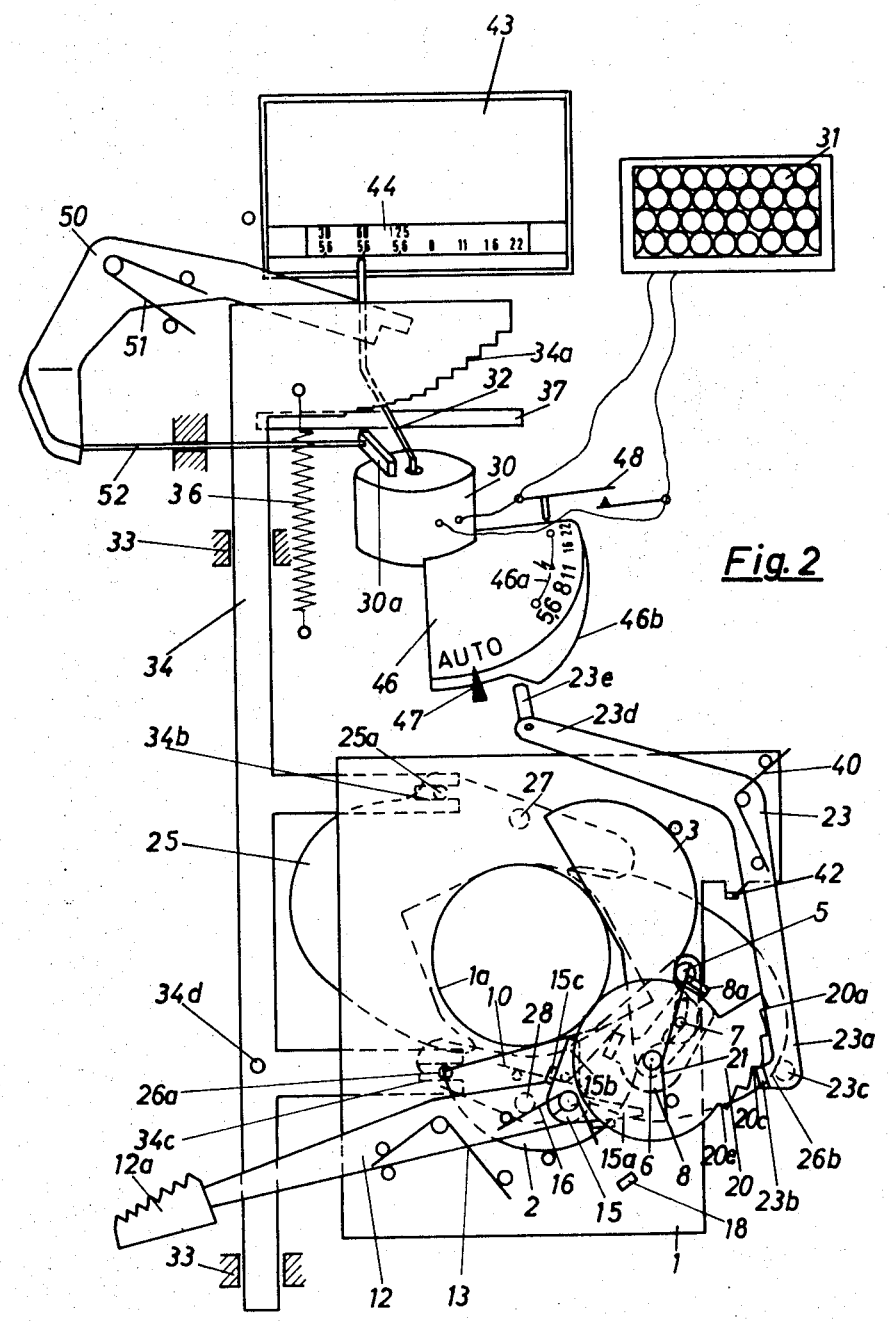
FIG. 2 is a view similar to FIG. 1 with the parts shown in the open position with a deflection of the exposure meter pointer resulting in the combination setting of stop "5.6" and time of one-sixtieth sec. on the basis of the exposure program established.
Figure 3:
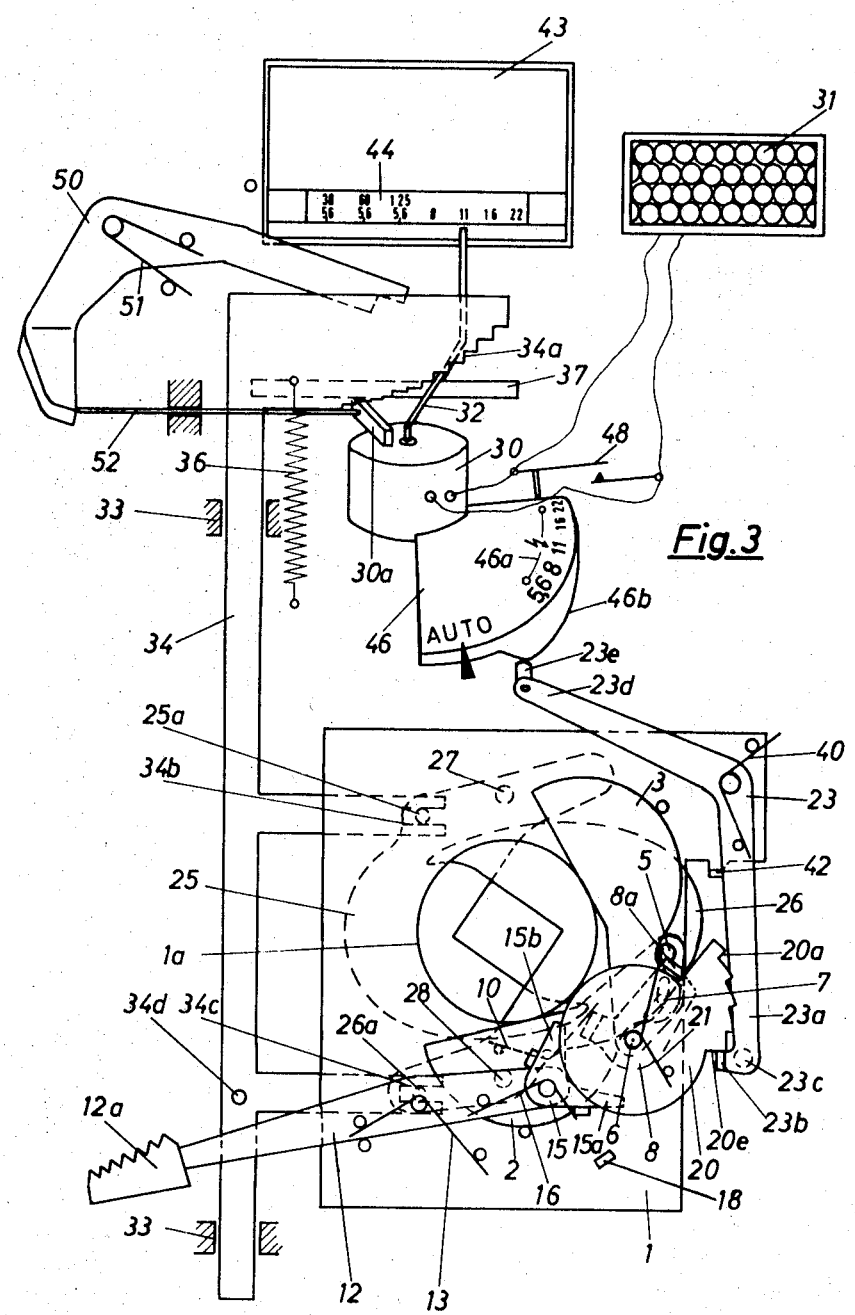
FIG. 3 is a view similar to FIG. 1 with the parts shown in the open position at a greater pointer deflection, resulting under the same exposure program as FIG. 2 in the pair of values: stop "11" and time one-twenty-fifth sec.

So that the photographer is enabled to recognize from the viewfinder 43 the working range in which the camera happens to be set, a pivoted indicating flag 50 is provided for the scale 44. The flag 50 is under the influence of a spring 51 and, by means of a shiftable setting pin 52, cooperates with the stop 30a of the exposure meter housing 30. When set to "AUTO," the flag 50, as shown in FIGS. 1 to 3, completely uncovers the scale 44 of the viewfinder 43. However, the flag 50, following stop 30a of the housing 30 under the influence of a spring 51, changes into the position shown in FIG. 4 when the diaphragm is set manually, in which position only the diaphragm values are visible which can be set for the "Manual" range 46a.

The operating mode of the invention described above and illustrated in the drawings is as follows:

To take photographs with diaphragm and time set automatically depending on lighting conditions, i.e. photographs with automatic programming, the setter 46 is brought into the setting shown in FIGS. 1 to 3 in which the "AUTO" is positioned opposite to the mark 47. The meter pointer 32 can thereby adjust itself, in accordance with the prevailing light, to a certain pair of exposure values, say one-sixtieth sec. and stop "5.6," as illustrated in FIGS. 1 and 2. When the winding and release lever 12 is actuated by pressure on the handle 12a, the arm 15a of the driving pawl 15 contacts the stationary stop 18 and turns clockwise, increasing the tension of drive spring 16. The scanning slide 34 follows the motion of the winding and release lever 12 under the effect of tension spring 36 until the step cam 34a strikes the meter pointer 32. The diaphragm blades 25 and 26 are thereby moved toward the exposure opening 1a, but without initially covering the opening. This occurs because the diaphragm blades 25, 26, from their normal position shown in FIG. 1 to their entry into the range of exposure opening 1a, traverse the unemployed path which is provided for setting the exposure time while the diaphragm stays open. During the motion of the diaphragm blades 25 and 26 toward the exposure opening 1a, the catch lever 23, with the pin 23c resting against the back portion 26b of the blade 26, follows under the influence of the spring 40, whereby the stop 23b positions itself in the path of the cam surface 20c of the raking weight 20 as illustrated in FIG. 2. Thus, depending on the diaphragm setting, an exposure time of, say, one-sixtieth sec. at the greatest stop "5.6," is automatically set.

In the further course of the winding motion of the winding and release lever 12, the arm 15a of the drive pawl 15 disengages from the stop 18 so that the pawl turns counterclockwise. The arm 15b thereby imparts a clockwise rotary motion motion to the actuating lever 8 which, taking the braking weight 20 along and transfers the shutter blades 2 and 3 into the open position. While the arm 15b of the drive pawl 15 slides off the actuating lever 8, the braking weight 20, driven by the kinetic energy imparted to it by the actuating lever during the opening motion, swings beyond the reversal point of the shutter blades 2 and 3 until the cam surface 20c of the weight strikes stop 23b of the catch lever 23 as shown in FIG. 2. Due to the increased tension given the spring 21 by the swinging motion of the braking weight 20, the weight is accelerated in the opposite direction after striking the stop, causing the weight to strike against the tab 8a of the actuating lever 8 and thereby causing it to return with the shutter blades 2 and 3 into the closed position. After removing the load from the winding and release lever 12, it returns into the normal position shown in FIG. 1 under the influence of spring 13, taking the scanning slide 34 along against the force of the spring 36.

When more favorable lighting conditions prevail, the meter pointer 32 deflects more and positions itself, for example, opposite the stop value "11" as shown in FIG. 3. Assigned to this diaphragm opening, as with all the diaphragm openings smaller than the greatest light stop, is the shortest exposure time of 1/125 sec. Upon depressing the winding and release lever 12, the following scanning slide 34 can therefore traverse a longer path than is the case with the diaphragm value "5.6." As soon as the diaphragm blades 25 and 26 enter the area of the exposure opening 1a, the following catch lever 23 contacts the stop 42, so that the stop 23b is located in the path of cam surface 20e of braking weight 20 provided for the shortest exposure time of, say, 1/125 sec. as illustrated in FIG. 3. The catch lever 23 stays in this position corresponding to that exposure time and the diaphragm blades 25 and 26 are now moved, in the further course of the actuation of the winding and release lever 12, into the exposure opening 1a by the scanning slide 34 due to the wider pointer deflection. With the scanning slide 34 meeting pointer 32, the blades 25 and 26 thereby leave uncovering an opening corresponding to light stop value "11" as shown in FIG. 3. At the end of the winding motion, disengagement of the drive pawl 15 is accomplished by the stationary stop 18, and the shutter opens in the manner described before, whereby the cam surface 20e of the braking weight 20 runs against the stop 23b of the catch lever 23 without swinging beyond in the reversal phase of the shutter blades 2 and 3 thereby immediately closing the shutter according to the shortest exposure time.

If it is desired to set the light stop manually, for instance for the purpose of taking flashbulb pictures, it is merely necessary to turn the setter 46 clockwise and to make the desired light stop value of the scale 46a oppose the mark 47. This adjustment causes the exposure meter to be short circuited by switch 48 so that the meter pointer 32 positions itself against the stop 30a of the exposure meter housing 30, it also moves clockwise, and its stop 30a takes the meter pointer 32 along which, for example, is set so as to oppose value "11" of scale 44 visible in viewfinder 43. The flag 50 follows the rotary motion of the stop 30a under the influence of the spring 51, assuming the position shown in FIG. 4. Finally, the supporting edge 46b of the setter 46 runs against the pin 23e of the catch lever 23 and takes it into a position in which the stop 23b is in the path of motion of cam surface 20a of the braking weight 20 so that in the "Manual" or flash range, and exposure time of, for example, one-thirtieth sec. is always provided.

It will be understood that the foregoing description with the details of exemplary structure is not to be construed in any way to limit the invention, but that modifications may be made thereto without departing from the scope of the invention as set forth in following claims.

I claim:

1. A photographic camera comprising: a shutter blade system; a diaphragm having at least two pivoted blades; an exposure-time-regulating device cooperating with said shutter blade system; an exposure meter built into said camera and a scanning device cooperating therewith for automatically controlling both the light stop and exposure time factors in an "AUTO" range and for manually presetting both of said factors in another range; control part engaging one of said diaphragm blades and participating in the setting motions of the said diaphragm blades, said control part forming a part of said exposure-time-regulating device, the setting of which part determines the duration of the exposure by said shutter blade system and wherein said control part of said exposure-time-regulating device is a pivotally mounted catch lever having one end biased against the back portion of said one of said diaphragm blades, and wherein a braking weight is provided having a plurality of radially stepped cam surfaces cooperating with said one end of said catch lever, said braking weight being engageable with said shutter blade system to participate in the opening motion thereof and mounted for back-and-forth movement to swing beyond the reversal phase of said shutter blade system against the force of a return spring, said shutter blade system being movable back and forth.

2. The photographic camera of claim 1 wherein said diaphragm blades have an override extending beyond the opening of said camera; and wherein said one of said diaphragm blades, said catch lever and said braking weight are configured so that differing exposure times are achievable only in the area of said override, and wherein upon the entry of said diaphragm blades into the area of said opening of said camera the exposure time remains constant as the diaphragm opening narrows steadily.

3. The photographic camera of claim 2 wherein said configuration of said one diaphragm blade, said catch lever and said braking weight is such that the light stop and exposure time can be changed jointly so that differing exposure values according to a predetermined program are thereby achievable.

4. The photographic camera of claim 1 wherein said catch lever supported at said one end against said one of the diaphragm blades is a two-armed lever engageable by a setter; said setter being operable to set said camera to automatic or manual light stop setting and having a supporting edge which becomes effective when set to said manual light stop setting, said edge being engageable with said catch lever for movement to a position in which an exposure time is achieved suitable for pictures taken free hand or with flashbulbs.

5. The photographic camera of claim 4 wherein said setter serving to set said camera from one to the other working range is mounted on a housing of said exposure meter for corotation and wherein a switch is provided in the circuit of said exposure meter for short circuiting said meter during the reversal from automatic to manual exposure setting.

6. The photographic camera of claim 5 wherein said setter and said housing of said exposure meter are configured so that upon short circuiting; said corotating motion positions an exposure meter pointer wherein with the aid of said scanning device cooperating with said pointer, the light stop value preset by means of said setter results.

7. The photographic camera of claim 6 wherein said housing of said exposure meter has a stop located in the plane of motion of said pointer against which stop said pointer comes to rest after said meter is short circuited.

8. The photographic camera of claim 4 wherein an indicating scale is associated with said exposure meter, said scale having harmonizing time and light stop values; and wherein an indicating flag is provided for said scale disposed so that said flag makes said scale visible in the "AUTO" setting of said setter, said flag being operable by said setter for movement in front of said scale in the "Manual" and flash working range wherein only the light stop values which can be set in that range are visible.

9. The photographic camera of claim 8 wherein a portion of said flag covering said scale values has symbols of a flash and of time value of the exposure time becoming effective in the "Manual" and flash working range.

10. A photographic camera comprising: shutter blade means on said camera; diaphragm means on said camera having a plurality of pivoted blades; an exposure meter; scanning means engageable with said exposure meter and said diaphragm means, said exposure meter and said scanning means automatically controlling both light stop and exposure time factors in an "AUTO" range and for manually presetting both of said factors in another range; and an exposure-time-regulating device having a pivotally mounted control lever engaging one of said diaphragm blades and movable during the setting motion thereof; and a braking weight being engageable with said shutter blade means and mounted to swing beyond the reversal phase of said shutter blade means and wherein said control lever is a pivotally mounted catch lever having one end biased against the back portion of said one of said diaphragm blades, and wherein said braking weight has a plurality of stepped cam surfaces cooperating with said one end of said catch lever, and wherein said braking weight is engageable with said shutter blade system in the opening motion thereof and is mounted for back-and-forth movement to swing beyond the reversal phase of said shutter blade system against the force of a return spring.

11. The photographic camera of claim 10 wherein said diaphragm blades have an override extending beyond the opening of said camera and wherein said lever supported at said one end against said one of the diaphragm blades is a two-armed lever engageable by a setter; said setter being operable to set said camera to automatic or manual light stop setting and having a supporting edge, said edge being engageable with said catch lever when set to said manual light stop setting movement of said lever to a position in which an exposure time is achieved suitable for pictures taken free hand or with flashbulbs.

12. The photographic camera of claim 11 wherein said setter serving to set said camera from one to the other working range is mounted on said exposure meter for corotation therewith; and wherein a switch operable by said setter is provided in the circuit of said exposure meter for short circuiting said meter during the reversal of said setter from automatic to manual exposure setting.

13. The photographic camera of claim 12 wherein said exposure meter has a stop located in the plane of motion of a pointer of said exposure meter against which stop said pointer comes to rest after said meter is short circuited by said switch.

14. The photographic camera of claim 13 wherein an indicating scale is provided for said exposure meter, said scale having harmonizing time and light stop values; and wherein an indicating flag is provided for said scale disposed so that said flag makes said scale visible in the "AUTO" setting of said setter, said flag being operable by said setter for movement in front of said scale in the "Manual" and flash working range wherein only the light stop values which can be set in that range are visible.

15. A photographic camera including shutter means, a pair of rotatably mounted blades, exposure-time-regulating means cooperating with said shutter means, said exposure-time-regulating means having a manual range for presetting both light stop and exposure time factors, an exposure meter built into said camera, scanning means cooperating with said exposure meter automatically controlling both the light stop and exposure time factors in an "AUTO" range, said time-regulating means having a control lever engageable with one of said blades during the setting movement of said blades, said scanning means acting directly on said control lever so that the position setting of said control lever determines the exposure time.